United States Patent
Barnett

(10) Patent No.: US 12,062,071 B1
(45) Date of Patent: Aug. 13, 2024

(54) METHOD AND SYSTEM FOR INVENTORYING AND DEVELOPING THE VALUE OF REAL PROPERTY

(71) Applicant: David M. Barnett, Ballston Spa, NY (US)

(72) Inventor: David M. Barnett, Ballston Spa, NY (US)

( * ) Notice: Subject to any disclaimer, the term of this patent is extended or adjusted under 35 U.S.C. 154(b) by 274 days.

(21) Appl. No.: 17/980,609

(22) Filed: Apr. 11, 2022

Related U.S. Application Data

(60) Provisional application No. 63/275,539, filed on Nov. 4, 2021.

(51) Int. Cl.
*G06F 16/30* (2019.01)
*G06F 16/29* (2019.01)
*G06Q 30/02* (2023.01)
*G06Q 50/16* (2012.01)

(52) U.S. Cl.
CPC ......... *G06Q 30/0278* (2013.01); *G06F 16/29* (2019.01); *G06Q 50/16* (2013.01)

(58) Field of Classification Search
CPC ..... G06F 16/29; G06Q 30/0278; G06Q 50/16
See application file for complete search history.

(56) References Cited

U.S. PATENT DOCUMENTS

| | | | | |
|---|---|---|---|---|
| 5,361,201 A | * | 11/1994 | Jost | G06Q 40/02 705/35 |
| 11,783,385 B1 | * | 10/2023 | Khosravan | G06Q 50/16 382/103 |
| 2009/0006185 A1 | * | 1/2009 | Stinson | G06Q 30/02 705/306 |
| 2019/0019261 A1 | * | 1/2019 | Lammert, Jr. | G06F 7/02 |
| 2021/0257112 A1 | * | 8/2021 | Coffin | G06T 7/97 |
| 2021/0374965 A1 | * | 12/2021 | Richter | G06N 20/00 |
| 2022/0398762 A1 | * | 12/2022 | Marsh | G06T 11/00 |

* cited by examiner

*Primary Examiner* — Mahesh H Dwivedi
(74) *Attorney, Agent, or Firm* — Stadler IP Law PLLC

(57) ABSTRACT

A method and system of inventorying and developing value for real property. An aerial photograph of a property to be inventoried and valued is obtained, an outline or outlines of the structure and its location on the property are identified, outlines of the structural sections of the property are mapped, a partial sketch of the outline of the structure is created, wherein the outline includes square footage estimates for each section, and is oriented with the front of the structure to the bottom of the page, and the information is integrated across multiple images and the structural type of each section of the structure is identified. The method and system rely on machine learning in order to increase the accuracy of the method and system.

8 Claims, 1 Drawing Sheet

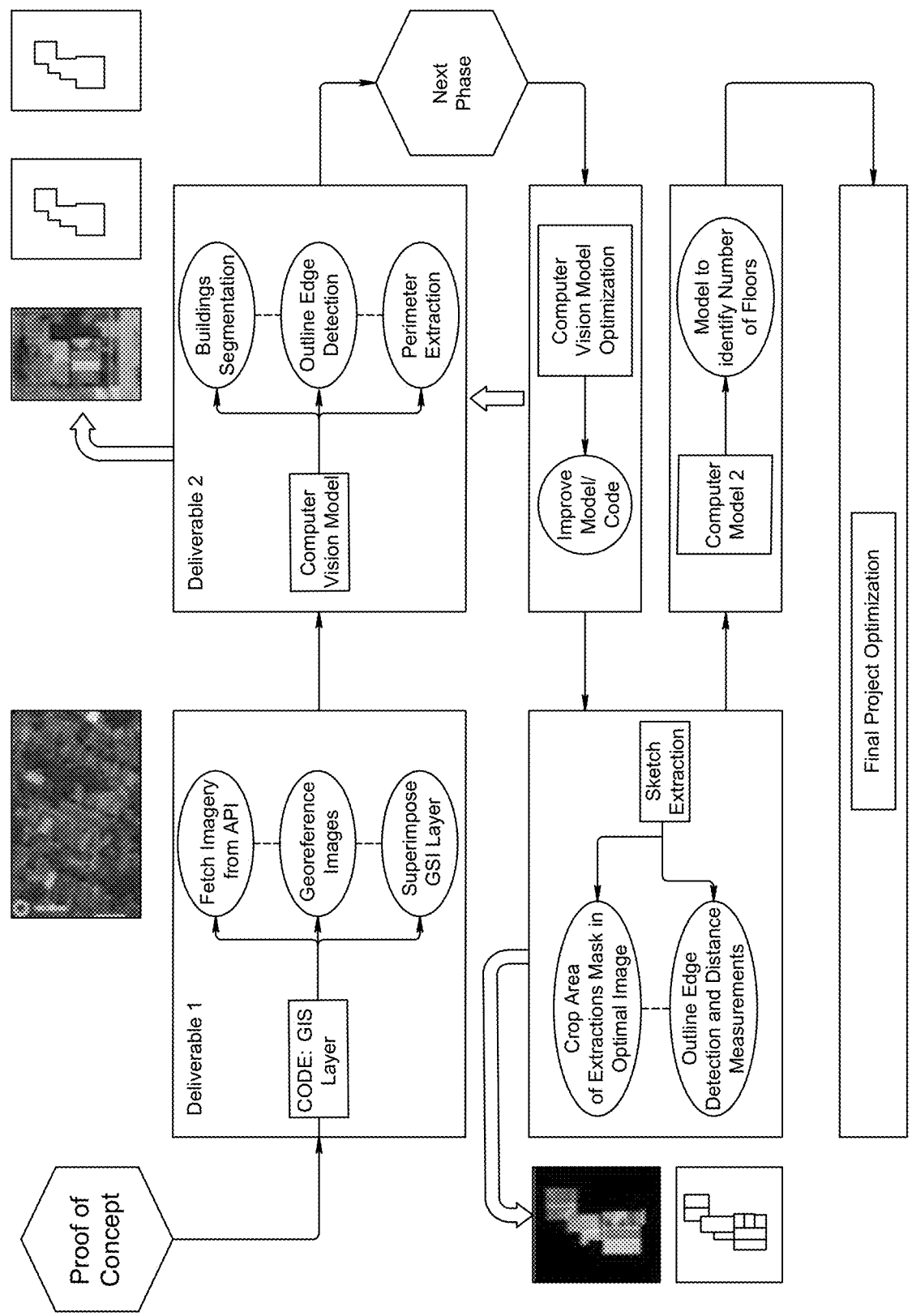

METHOD AND SYSTEM FOR INVENTORYING AND DEVELOPING THE VALUE OF REAL PROPERTY

CROSS-REFERENCE TO RELATED APPLICATIONS

This application claims priority to U.S. Provisional Application having Ser. No. 63/275,539, filed on Nov. 4, 2021, the entire disclosure of which is hereby incorporated herein by reference.

FIELD OF INVENTION

This invention is directed to a method and system of inventorying and developing value of real property. In particular, the method and system are highly accurate in inventorying and developing the value of real property.

BACKGROUND OF INVENTION

Historically, inventorying a property required an individual data collector to perform a site visit on each property in order to verify data about that property. The data collector would go to each individual property door to door and ask questions and collect data for purposes of inventorying the property. From there, the data collector would walk around the property and inventory what is on the property. For example, the data collector would inventory garages, decks, pools, and similar amenities. As can be imagined, this process is time-consuming and inefficient.

For a real property valuation services appraisal business charged with inventorying and developing values for large numbers of properties to support municipal tax reassessments for towns, cities, and counties, the process for municipal contracts is very manual and tedious. Data collectors inspect aerial and street-level images of thousands of properties in order to break down properties into structurally distinct segments, determine the square footage of each segment, identify the structural type (garage, covered porch, two-story no basement, etc.), and record all of this information in the form of a footprint or a sketch or sketches of the property.

Because this process is very time-consuming and resource-intensive, it would be beneficial if part or all of the process could be automated.

SUMMARY OF THE INVENTION

Accordingly, it is the subject of this invention to provide a method and system for automating the process of municipal assessment projects so as to reduce the required time, effort, and cost.

In one embodiment, the present method relies on aerial imagery taken during flyovers. It is envisaged that the aerial imagery is taken by a drone camera or another aerial photography method. Using the aerial imagery, a structure sketch is drawn using a program that allows the user to click and draw a line indicating the square footage of the property.

The sketch may then be taken to the physical property to discern that the area and property depicted in the structure sketch is accurate. The overall depiction of the property is arrived at by utilizing and synthesizing aerial and satellite imagery with street level imagery and other resources. The resultant imagery is used to train a model to be able to perform this process on a property that hasn't been visited via an on-site inspection.

Overall, this process and system is capable of creating highly accurate sketches that can be used for inventorying and developing the value of the property.

BRIEF DESCRIPTION OF THE DRAWINGS

FIG. 1 depicts a flow chart of the present invention.

DETAILED DESCRIPTION OF THE INVENTION

One embodiment of the present invention provides computer vision-based software that is capable of integrating information across multiple platforms and resources such as images, past sketches, and structured data sources such as Multiple Listing Service listings. The software is also capable of automatically generating sketches for the majority of properties and flagging properties that require manual review or physical site visits from data collectors. In particular, the present invention relies on machine learning.

The present invention comprises the steps of:
  obtaining multiple photographs of a property to be inventoried taken from a near-vertical overhead perspective;
  identifying the outline of the house or structure on the property and location of the front of the house or structure within the image;
  mapping outlines of structural sections of the house or structure from the image and computing square footage of each segment;
  returning a partial sketch of the outline of the house or structure with distinct structural sections specified, square footage estimates for each section, and oriented with the front of the house or structure to the bottom of the page; and
  integrating information across multiple images and identifying the structural type of each section of the house or structure.

The present invention relies on machine learning. Selected samples of imagery and sketches from verified dates are used to train the software. Coordinates, imagery, sketches, and property data are input into the model allowing the model to learn the accuracy of the imagery. The software may or may not require access to a graphics processing unit (GPU).

In one embodiment, machine learning results from overlaying sketch outlines on top of property images. First, the software is trained by identifying homes or structures within images, identifying the front of homes or structures based on structural properties and/or orientation of the home or structure relative to road, driveway, etc., and tracing the outline of a home or a structure and its sections, and computing square footage by section.

In one embodiment, the present method relies on aerial imagery taken during flyovers by a drone camera or another aerial photography method. Using the aerial imagery, an outline or sketch is drawn using a program that allows the user to click and draw a line indicating the footage of the property.

The outline or sketch is then taken to the physical property to discern that the area and property depicted in the sketch is accurate. The overall depiction of the property is arrived at by utilizing and synthesizing aerial and satellite imagery with street level imagery. The resultant imagery is used to train a model to be able to perform this process on a house that hasn't been visited via an on-site inspection.

Overall, this process and system is capable of creating highly accurate building plans and drawings that can be used for inventorying and developing the value of the real property.

In one embodiment, the model includes automated code for extracting, clipping and processing aerial imagery from an API. The system can be divided into two topics, GIS and computer vision.

A customized querying of an API and automated acquisition and storing of images in a cloud-based processor for the machine learning dataset.

The API provides the following to the user:
Automated authorization;
Facilitates data acquisition, single or multiple addresses;
    Allows a user to tailor the data format wanted;
Allows a user to store data both to a cloud-based process bucket or local storage; and,
As part of querying a gateway or as an independent method that can be used on image and its metadata file, a Georeferencing Image Function was developed which references geographically a given image on the earth's surface (for example, in New York State), and the clipping Image function which references the given's house address' parcel and clips the image based on its boundaries as provided by the municipality.

The format used to annotate the masks of the buildings for the training set is the Coco format.

The first phase is to annotate the original images and create the labels by manual image tagging. All the data is stored including annotated and not annotated in a database as a css file and this data guides the training phase.

In the database or data folder are batches that have been created and consists of original images that will be annotated. From the address points.csv we checked the condition of each batch.

Computer Vision Model

A U-Net 2 model was developed, which is a convolutional network architecture for fast and precise image segmentation. The model's code can be found in the database or processor or on a machine learning platform such as Amazon's Sagemaker®. In a database there is an abstract class that represents the dataset and there is a dataloader which is an iterator that is being used to batch, shuffle and load the data utilizing the dataset class.

Results

Two metrics to evaluate and monitor the model's training process were used. A combination of the Binary Cross Entropy (BCE) loss and the Dice Loss which allows for some diversity and stability in the loss through the training. Another indicator for the model's accuracy are the range errors, which are extracted by the intersection of the pixels that belong to the edges of the mask and the original images.

EXAMPLE

Example 1

Example 1 is depicted in FIG. 1. As can be seen, in the first step, Deliverable 1 is produced. This involves a geographic information system (GIS) LAYER Code that fetches imagery from a specific application programing interface (API), obtains georeference images, and superimposes a GIS layer on the imagery. The georeference images are provided by municipalities and include all of the information about the parcel including all of the boundaries. The georeference images may be stored in a database. The imagery is provided by drone photography or another method of acquiring aerial photographs so that it is taken directly above a parcel, building, or structure.

Deliverable 2 is provided by developing a computer vision model that outlines the edges of a building or structure and also outlines the perimeter of the building or structure. The computer vision model is run by logic. The computer vision model is also capable of providing building segmentation. That is, computer vision model includes data on what different rooms in a building look like based on size, location within the building, and other features.

From there, the Next Phase provides optimization and improvement of the model. The system may go back to the Deliverable 2 step if further improvements of the building or structure inventory is needed or the system may move onto the next step of Sketch Extraction, which involves either cropping the area of the extracted mask (of the perimeter of the building or structure) in the original image and/or outlining or edge detection and distance measurements of the extracted mask. Next, the system develops a second computer vision model, which identifies the number of floors of the building or structure. Finally, the system is optimized and the final product for the project is provided.

The GIS layer is provided by counties and municipalities and includes the parcel boundaries. All of the layers and data are uploaded into and stored in a database. The API then loads the aerial imagery of a dwelling. The superimposed layer is processed in a cloud-based processor such as Amazon Web Services® (hereinafter "AWS") or Microsoft Azure®. It is noted that any cloud-based processor may be used.

The GIS layer allows the system to georeference the layer. When a parcel layer is overlayed onto an aerial image, then the parcel information is used to georeference the parcel in the aerial image. That is, to locate where the parcel is.

In particular, the GIS layer is superimposed and overlaid onto the aerial image so that the parcel boundaries are known. Additionally, the GIS layer information will help create a scale for the measurements of the house. If the dimensions of the parcel from the GIS layer are known, then you know the scale for the measurements of the house.

The vision model uses data or information to identify segments of a dwelling based on the shape. For example, it will help identify the bathroom, living room, and other rooms of a house.

Example 2

Example 2 includes the following steps:
parcel or SBL is selected by a user and input into a parcel API;
location parameters are fetched from AWS S3 stored shameful data;
ortho imagery is fetched from imagery API;
metadata including parcel perimeter and boundaries is extracted and stored on AWS S3;
a model on AWS EC2 instance predicts a mask of the parcel; GIS code or GIS logic on AWS EC2 instance provides a georeference of the parcel and clips the parcel mask; python code or python logic on AWS EC2 instance extracts area data;
data is stored on S3 AWS; and,
data is sent or exposed to parcel API as a downloadable file.

It will be appreciated by those skilled in the art that while the method for inventorying and developing the value for real property has been described in detail herein, the invention is not necessarily so limited and other examples, embodiments, uses, modifications, and departures from the embodiments, examples, uses, and modifications may be made without departing from the process and all such embodiments are intended to be within the scope and spirit of the appended claims.

What is claimed is:

1. A computer-generated method comprising:
receiving, by a database, geographic information system layer input that includes parcel data;
receiving, by a server or a processor, the parcel data;
responsive to receiving the parcel data, the server or the processor initiates fetch logic to request aerial imagery from an imagery API;
responsive to receiving the aerial imagery, the imagery API overlays geographic information system layer onto the aerial imagery generating a superimposed layer;
receiving, by the database, the superimposed layer;
receiving, by a computer vision model from the database, the superimposed layer and a building dataset;
responsive to receiving the superimposed layer and the building dataset, the computer vision model initiates a vision logic, which generates a segmentation layer, a boundary layer, and a perimeter layer;
receiving, by the database, the segmentation layer, the boundary layer, and the perimeter layer,
receiving, by a sketch extraction model, the segmentation layer, the boundary layer, and the perimeter layer;
responsive to receiving the segmentation layer, the boundary layer, and the perimeter layer, the sketch extraction model uses sketch logic to generate a sketch layer;
receiving, by the database, the sketch layer;
receiving, by a second computer vision model, the sketch layer;
responsive to receiving the sketch layer, the second computer vision model initiates a second vision logic, which generates a floor layer;
receiving, by the database, the floor layer;
receiving, by the server or the processor, the floor layer; and,
responsive to receiving the floor layer, the server or the processor initials-initializes optimizing logic, which generates an optimized layer.

2. The computer-generated method of claim 1, wherein the parcel data is provided by a municipality.

3. The computer-generated method of claim 1, wherein the computer vision model is a machine learning platform and the second computer vision model is a machine learning platform.

4. The computer-generated method of claim 3, wherein the step of responsive to receiving the superimposed layer and building dataset, computer vision model initiates a vision logic, which generates a segmentation layer, a boundary layer, and a perimeter layer may be iterative and may be performed at least two times.

5. A computer-generated method comprising:
receiving, by a parcel API, geographic information system layer input that includes parcel data;
receiving, by a server or a processor, the parcel data;
responsive to receiving the parcel data, the server or the processor initiates fetch logic to request aerial imagery from an imagery API;
responsive to receiving aerial imagery, the imagery API overlays geographic information system layer onto the aerial imagery generating a superimposed layer;
receiving, by the server or the processor, the superimposed layer;
receiving, by a computer vision model from the server or the processor, the superimposed layer and a building dataset;
responsive to receiving the superimposed layer and the building dataset, the computer vision model initiates a vision logic, which generates a segmentation layer, a boundary layer, and a perimeter layer;
receiving, by the server or the processor, the segmentation layer, the boundary layer, and the perimeter layer,
receiving, by a sketch extraction model, the segmentation layer, the boundary layer, and the perimeter layer;
responsive to receiving the segmentation layer, the boundary layer, and the perimeter layer, the sketch extraction model uses sketch logic to generate a sketch layer;
receiving, by the server or the processor, the sketch layer;
receiving, by a second computer vision model, the sketch layer;
responsive to receiving the sketch layer, the second computer vision model initiates a second vision logic, which generates a floor layer;
receiving, by the server or the processor, the floor layer; and,
responsive to receiving the floor layer, the server or the processor initializes optimizing logic, which generates an optimized layer.

6. The computer-generated method of claim 5, wherein the parcel data is provided by a municipality.

7. The computer-generated method of claim 5, wherein the computer vision model is a machine learning platform and the second computer vision model is a machine learning platform.

8. The computer-generated method of claim 7, wherein the step of responsive to receiving the superimposed layer and building dataset, computer vision model initiates a vision logic, which generates a segmentation layer, a boundary layer, and a perimeter layer may be iterative and may be performed at least two times.

* * * * *